(12) United States Patent
Cassaro et al.

(10) Patent No.: US 9,467,727 B2
(45) Date of Patent: Oct. 11, 2016

(54) PORTABLE BROADCAST SYSTEM ACCOMMODATING MULTIPLE REMOTE USERS FOR DIGITAL AUDIO/VIDEO TRANSMISSION VIA WIRED OR WIRELESS IP OR 3G/4G NETWORKS

(71) Applicants: Michael G. Cassaro, Prospect, KY (US); Dennis S. Birkemeier, Louisville, KY (US)

(72) Inventors: Michael G. Cassaro, Prospect, KY (US); Dennis S. Birkemeier, Louisville, KY (US)

( * ) Notice: Subject to any disclaimer, the term of this patent is extended or adjusted under 35 U.S.C. 154(b) by 0 days.

(21) Appl. No.: 14/806,215

(22) Filed: Jul. 22, 2015

(65) Prior Publication Data

US 2016/0029060 A1 Jan. 28, 2016

Related U.S. Application Data

(60) Provisional application No. 62/027,287, filed on Jul. 22, 2014.

(51) Int. Cl.

| | |
|---|---|
| *H04N 7/173* | (2011.01) |
| *H04N 21/2665* | (2011.01) |
| *H04N 7/20* | (2006.01) |
| *H04N 21/218* | (2011.01) |
| *H04N 21/258* | (2011.01) |
| *H04N 21/426* | (2011.01) |
| *H04N 21/61* | (2011.01) |

(Continued)

(52) U.S. Cl.
CPC ............ *H04N 21/2665* (2013.01); *H04N 7/20* (2013.01); *H04N 21/21815* (2013.01); *H04N 21/25858* (2013.01); *H04N 21/4143* (2013.01); *H04N 21/426* (2013.01); *H04N 21/6143* (2013.01); *H04N 21/6175* (2013.01); *H04N 21/6405* (2013.01); *H04N 21/64322* (2013.01); *H04N 21/8106* (2013.01); *H04N 21/8173* (2013.01)

(58) Field of Classification Search
CPC .......... H04N 21/214; H04N 21/2187; H04N 21/2223; H04N 21/23614; H04N 21/2365; H04N 21/2665
USPC ......................................... 725/114, 144, 148
See application file for complete search history.

(56) References Cited

U.S. PATENT DOCUMENTS

| 6,385,647 B1 | 5/2002 | Willis et al. |
| 2004/0078825 A1 | 4/2004 | Murphy |

(Continued)

OTHER PUBLICATIONS

What is Raspberry Pi?; 5 webpages description; Raspberry PI Foundation UK Registered Charity; May 23, 2014 www.raspberrypi.org/help/what-is-a-raspberry-pi/.

(Continued)

*Primary Examiner* — Dominic D Saltarelli
(74) *Attorney, Agent, or Firm* — Whitaker Chalk Swindle & Schwartz PLLC; Stephen S. Mosher

(57) ABSTRACT

A system for simultaneously distributing program content originating from hundreds of remote multicast transmit units to a global network such as the Internet, and configured to receive at a host multicast receiver/server the transmitted program content segments from each of the remote multicast transmit units in real time, at full bandwidth and minimum latency. A command center station coupled to a first output of the multicast receiver/server for distribution of the program content segments via a satellite broadcast network interface to one or more affiliated stations and a second output of the multicast receiver/server via a third party network interface for streaming distribution to the affiliated stations.

19 Claims, 3 Drawing Sheets

(51) Int. Cl.
*H04N 21/643* (2011.01)
*H04N 21/81* (2011.01)
*H04N 21/4143* (2011.01)
*H04N 21/6405* (2011.01)

(56) References Cited

U.S. PATENT DOCUMENTS

2008/0120667 A1 5/2008 Zaltsman
2013/0324099 A1 12/2013 Dgani et al.

OTHER PUBLICATIONS

Texas Instruments Burr-Brown Audio; Stereo Audio DAC with USB Interface, Single-Ended Headphone Output and S/PDIF Output; 6 webpages product descriptons and parametrics; © 2003-2009 Texas Instruments Incorporated.

SDIO Simplified Specification Version 2.00; 4 webpages description; © 2000-2007 SD Card Association www.sdcard.org/developers/overview/sdio.

Opus; Opus Interactive Audio Codec; 2 webpages description; © 2011-2012 www.opus-codec.org.

GS1; GLN (Global Location Number) 1 page; Apr. 21, 2014 www.gs1.org/barcodes/technical/idkeys/gln.

Barix; News and Techical Update; 3 pages; Apr. 21, 2014 www.barix.com.

P.A. Stevens and M. Zemack; Stadardising Audio Contributions over IP Communications; Research White Paper; WHP 170; Oct. 2008; British Broadcasting Corporation; 15 pages.

Muller, "Live MP3 Streaming from Audio-In with DarkIce and Icecast2 on Raspberry Pi", retrieved from online on Sep. 11, 2015; retrieved from the internet <URL:https://stmllr.net/blog/live-mp3-streaming-from-audio-in-with-darkice-and-icecast2-on-raspberry-pi/ Aug. 10, 2012; especially p. 1, paragraph 1, p. 2, paragraphs 2 and 3; 56 pages.

PORTABLE BROADCAST SYSTEM ACCOMMODATING MULTIPLE REMOTE USERS FOR DIGITAL AUDIO/VIDEO TRANSMISSION VIA WIRED OR WIRELESS IP OR 3G/4G NETWORKS

CROSS REFERENCE TO RELATED APPLICATION

This Application claims priority to U.S. Provisional Patent Application Ser. No. 62/027,287 filed Jul. 22, 2014 and entitled PORTABLE BROADCAST SYSTEM ACCOMMODATING MULTIPLE REMOTE USES FOR DIGITAL AUDIO/VIDEO TRANSMISSION OVER 3G/4G SERVICES, by the same inventors.

BACKGROUND OF THE INVENTION

1. Field of the Invention

The present invention generally relates to radio and television broadcasting systems and more particularly to apparatus for originating and processing for broadcast audio and video program content via the Internet or other communications network.

2. Background of the Invention and Description of the Prior Art:

The concept of multiple remote, program originating terminals transmitting live program content via Audio over Internet Protocol (AoIP) is known in the art. In a typical system, the remote terminals feed program content to a host station or server for distribution or broadcast to recipient receivers. The remote terminals for providing these services are generally technologically advanced and therefore tend to be expensive, limited production units that require technically trained personnel to install and use them for their intended purpose. Many of such conventional units, though capable of high quality audio content, tend to be limited in bandwidth to the minimum necessary for the program content expected to be processed by the equipment.

In certain systems that contemplate originating and processing audio and video program content of the highest quality in real time and requiring very high bandwidth, there are no known practical choices for remote terminals available at reasonable costs, in particular in a system that contemplates scores of remote locations or even several hundred remote locations, all feeding live content to a host server for broadcast in real time. The costs of currently available equipment are prohibitive for systems comprising hundreds of remote stations or feeds, for example including news gathering organizations that broadcast live reporting at numerous distant locations.

Another example is a large scale sporting event such as Olympic competitions, championship matches or tournaments, etc. Further, it is impractical to expect all personnel manning the remote locations to be technically proficient in installing or setting up their remote terminal equipment in preparation for producing a live report to a central host location for integration into a broadcast program or network. Moreover, such remote terminal units must be fully compatible with the receiving equipment in bandwidth, and in the ability to receive and coordinate live feeds in real time from hundreds of remote units. In addition, like the remote units, it would be an advantage if the central receiving equipment may be operated with a minimum of technical support in supplying live program feeds to a variety of distribution and broadcast networks.

A principle disadvantage of prior art remote broadcast terminal equipment is its complexity and requirement for trained personnel, and its high cost that prohibits its use in a system or network consisting of hundreds of mobile and readily reconfigurable remote terminals. Further, many of the prior art devices have excessive latency—a disadvantage in systems where high quality of both audio and video is essential, as in systems processing live program content originating from many locations. Moreover, since it is impractical in such systems to have trained technical personnel at every remote, the equipment must be easy to set up and use to provide live feeds operated by non-technical operators.

There is thus a substantial need for remote terminal equipment that has very high bandwidth capacity in processing audio and video program, is configured to be plug-and-play—installed and used as a portable unit by non-technical personnel, is low in cost to permit economical manufacture and use in systems that include hundreds of remote terminals, and which can also be used in slightly modified form as receiving stations for integration into distribution and broadcast networks and the like.

SUMMARY OF THE INVENTION

Accordingly there is provided a system for simultaneously distributing program content originating from hundreds of remote locations, comprising 1 to N multicast transmit units each having at least one program input coupled to an individual audio or video program content source providing a program content segment, and a communication interface output coupled to a global network such as the Internet, wherein N may be=several hundred units; a host multicast receiver/server coupled to the Internet via an input communication interface and configured to receive and coordinate transmitted program content segments from each of the 1 to N remote multicast transmit units in real time, at full bandwidth and minimum latency; and a command center station coupled to a first output of the multicast receiver/server for distribution of the program content segments via a satellite broadcast network interface to one or more affiliated stations and a second output of the multicast receiver/server via a third party network interface for streaming distribution to the affiliated stations.

In one aspect there is provided herein a device called an IP Multicast Box that is primarily designed to be used as a remote broadcasting terminal—i.e., a remote multicast transmit unit for originating live audio and video program feeds to be transmitted to a central receiving location for distribution and rebroadcast to receiving locations. The IP Multicast Box—also named herein as a terminal device—when used as the central receiving unit by slight change in its configuration becomes a host multicast receiver/server unit. Through a novel combination of components and software, some existing, some created originally for this invention because it did not previously exist, the unit is portable, and easy to install and use by non-technical personnel. The unit requires only a power supply, a program content input for audio or video, and an output for coupling to a global network such as the Internet. The unit in either configuration is also low in cost yet capable of state-of-the-art performance, particularly in terms of its wide bandwidth and low latency that provides very high quality and seamless, real time transmission to the central distribution location.

In one embodiment, the remote multicast transmit unit is a portable, self-contained transmission terminal for originating program content from remote locations to be streamed over a global network, which comprises, in combination a microcomputer system having a program input, internal memory, an external memory port, and a communication interface output; a sound or video card coupled between a program source device and the program input for supplying program content; an external memory coupled to the external memory port; an ethernet interface in the microcomputer system coupled to the communication interface output; an operating system stored in the internal memory for configuring and controlling the microcomputer; a suite of application programs stored in the external memory for supporting a plurality of operations; and a CODEC operable in the microcomputer to encode and decode the program content processed by the microcomputer with very low latency.

In another embodiment the host multicast receiver/server is a portable, self-contained receiving terminal for receiving program content to be streamed over a global network, comprising a microcomputer system having a program input, internal memory, an external memory port, and a communication interface input; an external memory coupled to the external memory port; an operating system stored in the internal memory for configuring and controlling the microcomputer; a suite of application programs stored in the external memory for supporting a plurality of operations; a CODEC operable in the microcomputer to decode and encode the program content processed by the microcomputer; an ethernet interface in the microcomputer system and coupled to the communication interface input for receiving program content transmissions from one or more remote terminal devices; and first and second outputs respectively for providing a streaming data connection to a global network terminal and a sound or video card.

DETAILED DESCRIPTION OF THE INVENTION

Introduction

Described herein is apparatus that provides an advance in the state of the art for remote broadcasting equipment. The invention is embodied in a device called an IP Multicast Box that is primarily designed to be used as a portable remote broadcasting terminal for originating live audio and video program feeds. The deficiencies of the prior art pointed out herein above are overcome by the combination of careful design of the architecture of the system (including selection of its components) and the IP Multicast Box, and the custom software needed to operate these elements together in the most efficient manner, such that technical expertise is not required to use the system.

Briefly, in use the program content is processed for transmission, preferably via an Internet connection, to a single unit at a central receiving location for distribution and rebroadcast to receiving locations. The IP Multicast Box—also named herein as a remote multicast transmit unit or as a host multicast receiver/server unit—may thus be used as either the remote unit or as the central receiving unit by only a slight change in its software configuration. Through a novel combination of components and software, some existing, some created originally for this invention because it did not previously exist, the unit is portable and easy to install and use (plug-and-play) by non-technical personnel. It is also low in cost yet capable of state-of-the-art performance, particularly in terms of its wide bandwidth and low latency that provides very high quality sound (or video) and seamless, real time transmission to the central distribution location. The invention, and the system in which it is intended to be used, are especially adapted to live broadcast of events that require the processing of live program content originating from many remote locations and transmitted via the Internet to a host receiver/server for distribution via Internet broadcast to multiple recipients. Examples include large-scale sporting events, conferences, educational assemblies in on-line courses, global news-gathering situations, to name just a few.

DETAILED DESCRIPTION

Figure 1:
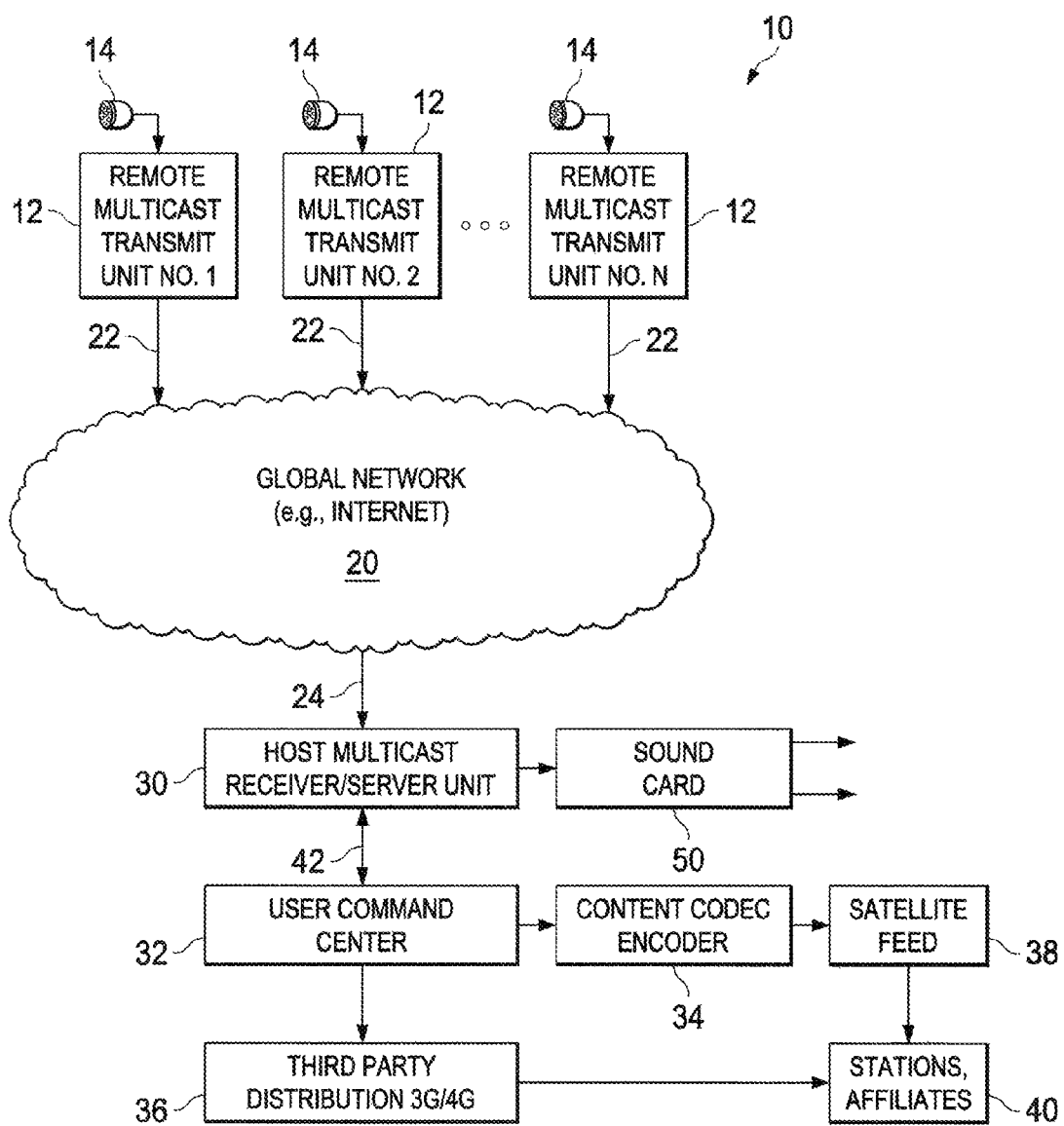
FIG. 1 illustrates a system block diagram of a multicast broadcast system using the IP multicast apparatus of FIGS. 2 and 3 according to a preferred embodiment of the present invention.

FIG. 1 illustrates a block diagram of a system of a plurality of remote multicast transmit units coupled via a global communications network such as the Internet to a single host multicast receiver/server unit, which is in turn coupled to a user command center work station having an input coupled to a first output of the host multicast receiver/server. The command center 32 is provided for processing the distribution of the program content segments from a first output via a satellite broadcast network interface to one or more affiliated stations and a second output of the multicast receiver/server via a third party network interface for streaming distribution to the affiliated stations. The IP multicast system 10 (multicast system 10) may, as a practical matter, include up to N=500 remote multicast transmit units 12, each coupled to a global communications network 20 such as the Internet via a suitable link 22, which in turn may be coupled via the Internet 20 through a suitable link 24 to a single host multicast receiver/server 30 operated in conjunction with the user command center 32 (workstation 32). Because of the architecture of the multicast transmit 12 and receive 30 units, which as will be described (see FIGS. 2 and 3) share some of the same hardware components, and the custom software engineered to operate them, the host multicast receiver/server 30 may receive program content signals from all of the N remote multicast transmit units 12 simultaneously with minimal latency. In other words, the host server unit can handle up to 500 multicast transmit units. This capability enables live broadcast of events wherein large numbers of remote sources may originate program content for coordination and transmission to any of a variety of receiving stations and affiliates without noticeable speech delay.

The program content may originate, for example as baseband audio—analog or digital—from a microphone 14 (or other originating source such as recorded audio, a video feed, other recorded program segment, etc.) connected to an input of each multicast transmit unit 12. The host multicast receiver/server 30 communicates with a user command Center 32 via the bidirectional link 42 between them. The user command center 32 provides outputs to a content codec encoder 34 to generate streaming program for a satellite feed 38, and a third party distribution processor 36 for sending program content via a 3G/4G network. Both encoder 34 and satellite feed 38, and processor 36 provide links to receiving stations and affiliates as required for the particular program content being broadcast.

Figure 2:
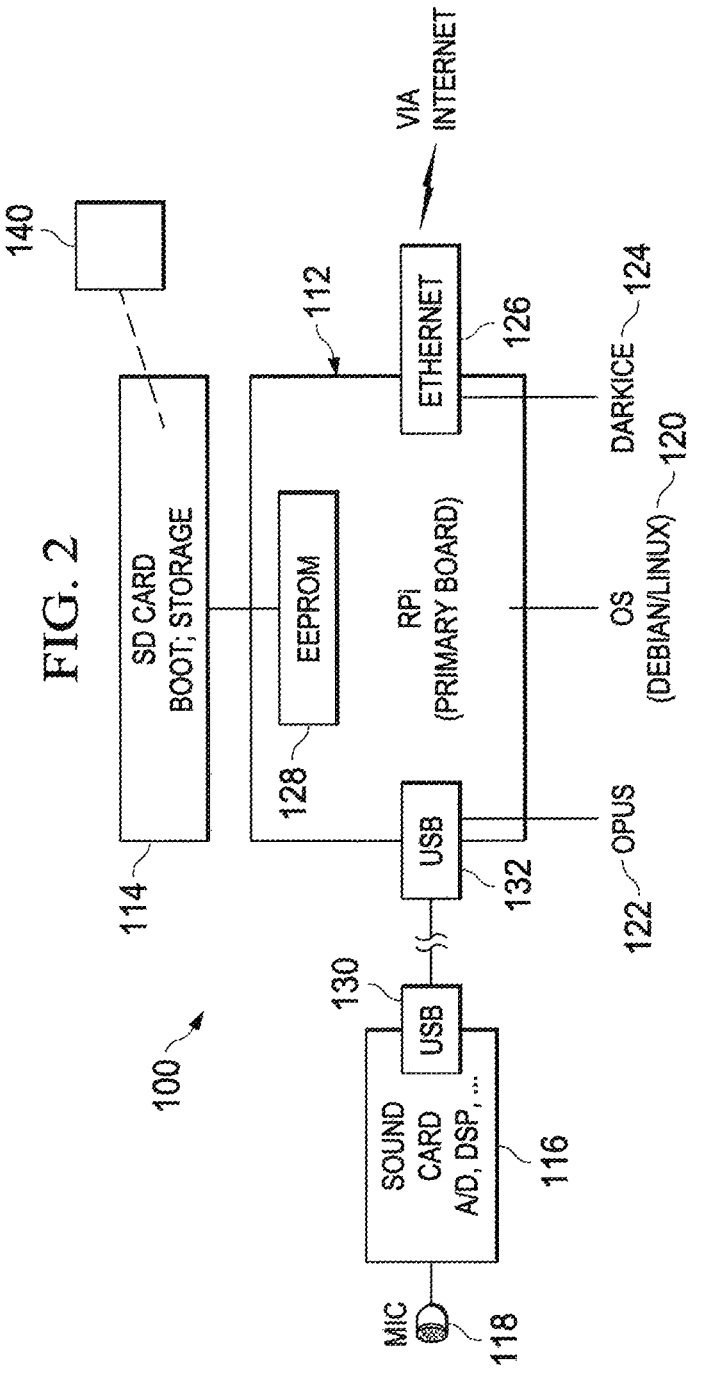
FIG. 2 illustrates a simplified block diagram of a multicast unit configured as a remote transmit device according to a preferred embodiment of the present invention.
Figure 3:
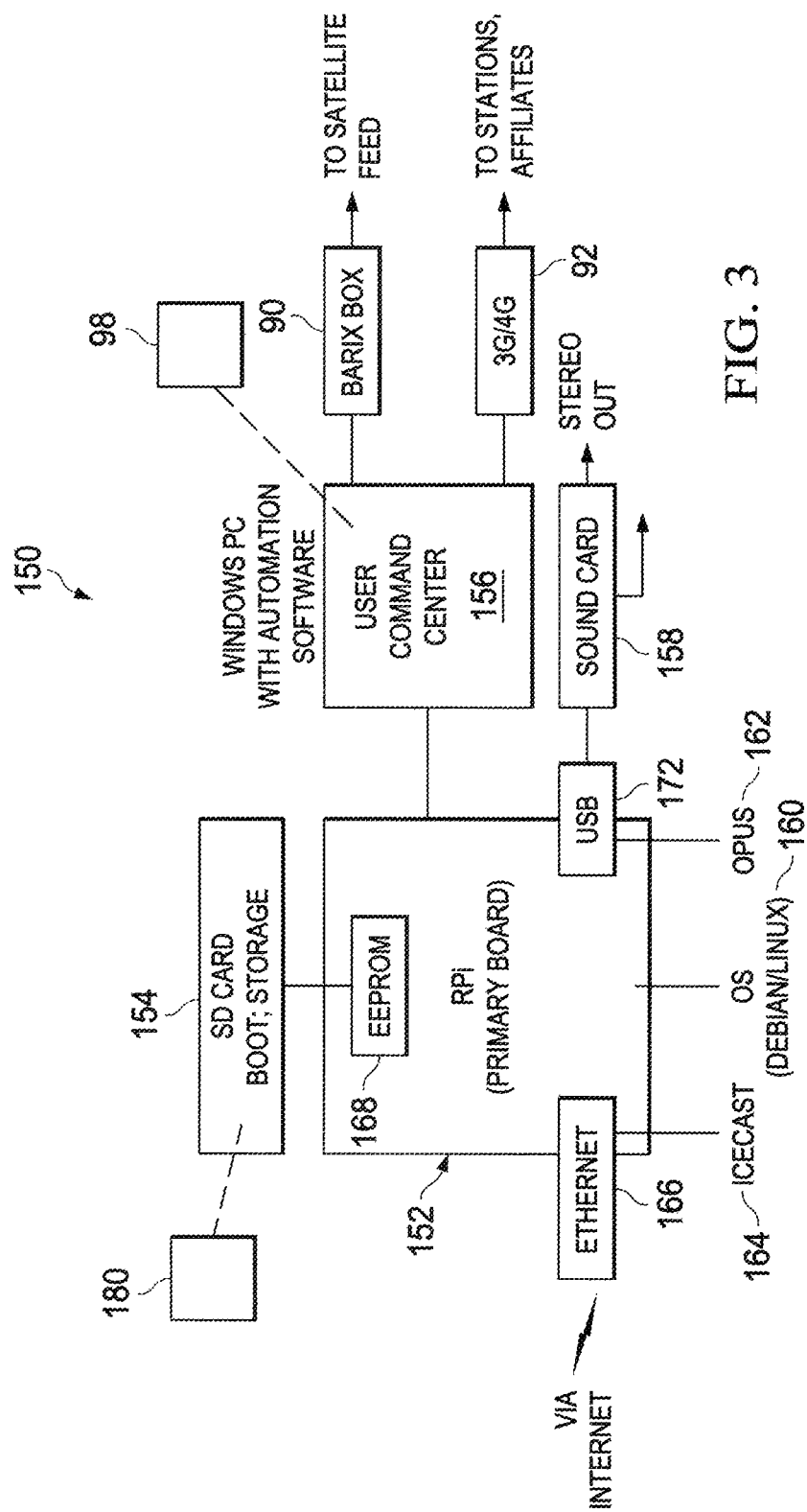
FIG. 3 illustrates a simplified block diagram of a multicast unit configured as a host receiver/server or central receiving station according to the present invention.

FIG. 2 illustrates a simplified block diagram of one embodiment of a basic, plug-and-play, IP Multicast Box 200 (not separately shown) configured as a remote multicast transmit unit 100 according to a preferred embodiment of the present invention. FIG. 3 depicts an IP multicast Box 200 configured as a host receiver/server unit 150 according to the preferred embodiment. It will become apparent that the IP Multicast Box 200 is a dual-use device—a compact, portable apparatus that is used in either a transmitter or receiver configuration depending upon the software programmed into its EEPROM chips is configured. As shown I FIGS. 2 and 3 both versions of the IP Multicast Box apparatus share the same hardware and most of the software. In brief, referring to FIG. 1, the transmit unit 12 (112 in FIG. 2) processes program content in a recording mode while the receiver/server unit 30 (152 in FIG. 3) processes program content basically as a playback mode.

The IP (for Internet Protocol) Multicast Box 200 is assembled from selected high performance but low cost components that are modified with custom software to provide the novel functionality to enable it to provide the broadcast services required for events that can originate a large number of live feeds to a single host for distribution to receiving stations and affiliates. Further, the IP Multicast Box 200 as configured and described herein combines exceptional performance and unusual simplicity of use in a single device. The latter attribute is exemplified by the fact that it requires only three connections: to a program source of audio (or video) such as a microphone; to a connection to the Internet (or other global communication network) via an Ethernet/USB link; and to a power supply such as a battery. The user does need to be technically trained or skilled, an important advantage of the invention that facilitates its use in the kind of broadcast system that originates from a large number of remote sites.

Continuing with FIG. 2, a remote configuration of the IP Multicast Box 200 as a multicast transmit unit 100 is shown including its constituent components a microcomputer (uC) system 112, an SD card 114 that functions as external memory connected to the microcomputer system 112, and a sound card 116, which may also be connected to the microcomputer system 112 via respective USB interfaces 130, 132. The microcomputer system 112 includes an operating system 120, preferably a Debian and Arch Linux ARM (asynchronous response mode) for implementing an OPUS Codec 122 and its accompanying encoding/decoding algorithms. A software component called Darkice 124 operates as a transport vehicle for the OPUS compressed audio program content originating at the remote transmit unit 100 such as from a microphone 18 or other source device. The SD card 114 provides external storage for a suite 140 of application programs to be described.

FIG. 3 illustrates a simplified block diagram of one embodiment of a basic, plug-and-play, IP Multicast Box 200 configured as a host multicast receiver/server 150 (or central receiving station 150) according to the present invention. The block diagram of its constituent components includes a microcomputer (uC) system 152, an SD card 154 connected to the microcomputer system 152, and a sound card 156, which may also be connected to the microcomputer system 152 via USB interface 172. The host multicast receiver/server 150 receives compressed audio (or video) content sent from each one of up to several hundred remote transmit units 100 via the Internet (See global network 20 in FIG. 1) at an Ethernet interface 166 under the control of a software component called an Icecast transport vehicle 164. The microcomputer system 152 includes an operating system 160 preferably in this embodiment a Debian and Arch Linux ARM (asynchronous response mode) for implementing an OPUS Codec 162 and its accompanying encoding/decoding algorithms. The CODEC 122, 162 used respectively in the multicast transmitter and the host multicast receiver/server comprises a bit rate of at least 510 Kbits/sec, a sampling rate of at least 48 KHz, and latency not to exceed 22.5 msec for a frame size of 20 msec.

The program content originating at the remote transmit units 100 may be provided by a microphone 118 or other source device connected to each remote multicast transmit unit 100. The SD card 154 provides external storage for a suite 180 of application programs to be described. The host multicast receiver/server 150 further includes connections to a user command center 156, which may preferably be a Windows PC configured with automation software to control and coordinate sending the compressed audio/video program content to a link to a satellite feed via a decoding/re-encoding unit such as a Barix Extreamer 500 ("Barix Box 90") for broadcast. The user command center 156 may also provide the program content via 3G or 4G cellular networks for distribution to concurrent listening locations. Further, a sound card 158 may also be coupled to a USB output 172 of the microcomputer system 152 for supplying baseband audio to appropriate transducers (not shown).

Each multicast unit 200 (remote transmit unit 100, host receiver/server unit 150) includes a respective suite of software applications for controlling various functional aspects of the respective remote or host unit in the system. In general both multicast units 100, 150 contain the same hardware and software. Except as noted above, the software 140, 180 is stored in the respective SD cards 114, 154, and includes the following components.

(A) For the sound card—programmed EEPROM chip and software/driver/codec; allows connection to peripheral microphone, communication to USB port, communication with the primary board (microcomputer 112 or 152), and partial A/D conversion of the input analog signal.

(B) Loaded in the SD memory card 114, 154 are a number of software components—(1) the base operating system used in a non-GUI (graphical user interface) mode, programmed to facilitate all software interaction by running automatically the custom software and scripts to eliminate the need for end-user interaction; (2) communication interface between the SD card 114, 154 itself and the primary board 112, 152, the sound card 116, 156, the Ethernet controller 126, 166, and the peripheral ports; and (3) the software that compiles the code for the OPUS/MP3 codec encoding.

(C) The EEPROM chipset 128, 168 is flash programmed through an interface on the SD card 114, 154 for timing pulse intervals, assist in packet delay, calculating network response times and communicating through system RAM for data associated with the audio controller and D/A conversion. There is one difference in the software on the respective SD cards 114, 154 in that the host multicast receiver/server unit 150 is programmed to receive program content (i.e., as a "listener"), and the remote multicast transmit unit 100 is programmed to transmit program content.

The custom software developed for the IP Multicast Box includes the following programs. In general, these functional components may be stored in the SD card and called as needed.

A data controller, which resides within a library accessed from a raw storage server, interfaces and integrates an I2C peripheral and clock functions; and communicates with an Audio Data Controller (ADC) and a Master Analog Controller in the IP Multicast Box. The data controller also functions as a packet loss concealer, provides seamless patching of audio after real-time analysis of post-encoded audio in a buffer-staged holding pattern to ensure true-to-form source-to-destination audio without realized dropout or packet loss.

A capture controller is used to sample and convert raw audio (analog and digital) packets and relay the converted data in systematic packet delay for processing and controlled buffer state through the playback controller.

A RAM preparation controller initializes random access memory on an empty-process charting configuration to take advantage of unused process allowances to enable encoding in real time the data forwarded to the sound card and through the audio encoder (OPUS).

An interlink code is a binding code platform used to effectively cross-communicate between standardized hardware and certain proprietary software/code layers. The interlink code contains elements of ALSA/JACK/Linux/Application drivers/and DMA controllers. The binding code is not centralized or actively running; rather, it initiates on demand and scales to accept incoming audio or to process controllers for outgoing digital audio for deployment.

A staging and deployment codec establishes a direct VPN (virtual private network) link in a swarm configuration from "device-to-hive" technology (this is to facilitate the remote transmit IP Multicast Box—to the receive/server IP Multicast Box link). The codec uses an algorithm to find open channels to source and reverse-VPN connect, thereby eliminating the necessity for implementing a port-forwarding and approval standard in most client/host communications.

Regarding the user command center 32, custom software on the Windows PC runs a virtual Linux distribution. It is also responsible for processing incoming audio (program content) stream organization, decoding OPUS codec, A/D conversion, timing, overall network connectivity to program streams, sound optimization, player for the OPUS codec on non-implemented systems, etc. The content codec encoder 34 for the satellite feed 38 may be an audio over IP device such as, e.g., a Barix model Extreamer 500 unit available from www.barix.com.

CONCLUSION

While the invention has been shown in only one of its forms, it is not thus limited but is susceptible to various changes and modifications without departing from the spirit thereof. As described herein there is provided a preferred embodiment of a system and apparatus for simultaneously distributing program content originating (transmitted) from hundreds of remote locations, comprising 1 to N multicast transmit units each having at least one program input coupled to an individual audio or video program content source providing a program content segment, and a communication interface output coupled to a global network such as the Internet, wherein N may be=several hundred units; a host multicast receiver/server coupled to the Internet via an input communication interface and configured to receive and coordinate transmitted program content segments from each of the 1 to N remote multicast transmit units in real time, at full bandwidth and minimum latency; and a command center station coupled to a first output of the multicast receiver/server for distribution of the program content segments via a satellite broadcast network interface to one or more affiliated stations and a second output of the multicast receiver/server via a third party network interface for streaming distribution to the affiliated stations.

The system disclosed herein thus combines selected off-the-shelf components—both hardware and software—with custom software designed to control the processing, interfacing, and communication of the data throughout the system linked together via the Internet. It is a novel system in that the same architecture is used for both transmit (remote) and receive (server) operation and that the same one-for-one bandwidth (e.g., from one source to one recipient) accommodates the program data from multiple sources or multiple recipients. Moreover, the latency is reduced far below prior art ISDN communication links through judicious selection and utilization of components (such as the OPUS codec and the "icecast" and "darkcast" transport vehicles that facilitate the audio over IP data) that eliminates latency bottlenecks. The system also readily accommodates adaptation to operation via 3G/4G networks in regions that lack Internet connectivity.

What is claimed is:

1. A remote broadcasting system for simultaneously distributing audio or video program content originating from hundreds of remote locations via a single broadcast channel host, comprising:
    a plurality of portable multicast transmit units each having at least one program input coupled to an individual audio or video program content source providing a program content segment, and a communication interface output coupled to a global network;
    a portable host multicast receiver/server coupled to the global network via an input communication interface and configured to receive and coordinate transmitted program content segments from each of the plurality of multicast transmit units in real time, wherein bandwidth and timing of the originating content is substantially maintained; and
    a user command center coupled to a server output of the portable multicast receiver/server for distribution of the program content segments via a first output to a satellite broadcast network interface to one or more affiliated stations and a second output of the portable multicast receiver/server via a third party network interface for streaming distribution to the one or more affiliated stations; wherein
    the portable multicast transmit unit and the portable host multicast receiver/server unit are substantially identical as to the combination of hardware components and differ with respect to whether custom software is configured for operation in a transmit or receive mode; and
    the substantially identical hardware components include a microcomputer, an interchangeable EEPROM, and a CODEC.

2. The system of claim 1, wherein a multicast transmit unit comprises:
    a microcomputer system having a program input, internal memory, an external memory port, and a communication interface output;
    a sound or video card coupled between a program source device and the program input for supplying program content;
    an external memory coupled to the external memory port;

an ethernet interface in the microcomputer system coupled to the communication interface output;
an operating system stored in the internal memory for configuring and controlling the microcomputer;
a suite of application programs stored in the external memory for supporting a plurality of operations; and
a CODEC operable in the microcomputer to encode and decode the program content processed by the microcomputer.

3. The system of claim 2, wherein the microcomputer system comprises:
a Raspberry Pi single-board microcomputer; and
an Icecast software module for streaming audio content from the sound card.

4. The system of claim 2, wherein the operating system comprises:
a Debian/Linux-based operating system.

5. The system of claim 2, wherein the external memory comprises:
an SDIO-compatible memory card.

6. The system of claim 2, wherein the sound card comprises:
a generic sound card configured for interfacing with the microcomputer and its operating system.

7. The system of claim 2, wherein the CODEC comprises:
an OPUS CODEC having a bit rate of at least 510 Kbits/sec, a sampling rate of at least 48 KHz, and latency not to exceed 22.5 msec for a frame size of 20 msec.

8. The system of claim 1, wherein the host multicast receiver/server comprises:
a microcomputer system having a program input, internal memory, an external memory port, and a communication interface input;
an external memory coupled to the external memory port;
an operating system stored in the internal memory for configuring and controlling the microcomputer;
a suite of application programs stored in the external memory for supporting a plurality of operations;
a CODEC operable in the microcomputer to decode and encode the program content processed by the microcomputer;
an ethernet interface in the microcomputer system coupled to the communication interface input for receiving program content transmissions from one or more remote terminal devices; and
first and second outputs respectively for providing a streaming data connection to a global network terminal and a sound or video card.

9. The system of claim 8, further comprising:
a sound or video card coupled between the second output and a remote system having a playback transducer.

10. The system of claim 8, further comprising:
a user command center coupled to the first output for processing the program content for distribution via a communication link to distribution affiliate nodes.

11. The system of claim 10, wherein the user command center comprises:
a Windows-configured personal computer or workstation; and
automation software for controlling transmission to the distribution affiliate nodes.

12. The system of claim 10, wherein the affiliate nodes include any one or more of satellite transmission stations, cable transmission stations, internet servers, cellular hubs, and Internet portals.

13. The system of claim 8, wherein the microcomputer includes:
a Darkice software module for streaming program content to a streaming server.

14. The system of claim 1, wherein the user command center comprises:
a work station computer including operating system software, display, keyboard and mouse, and a graphical user interface;
an automation program software for managing and coordinating program content segment distribution;
an audio or video decompression and processing means; and
a system security firewall administrator.

15. The system of claim 14, wherein the satellite broadcast network interface comprises:
a point-to-point VoIP Codec encoder; and
a serial output port and interface for coupling to a satellite uplink provider.

16. The system of claim 14, wherein the third party network interface comprises:
a browser;
a software-based streaming processor; and
a communications interface coupled to the global network.

17. The system of claim 1, wherein:
the portable multicast transmit unit and the portable host multicast receiver/server unit are substantially identical as to the combination of hardware components and differ with respect to whether custom software is configured for operation in a transmit or receive mode and whether program content processing is configured for record or playback;
installation and operation of the portable multicast transmit unit requires only connections to an audio or video source, the global network, and a power supply; and
installation and operation of the portable multicast receiver/server unit requires only connections to the global network, the user command center, and a power supply.

18. The system of claim 1, wherein:
the global network includes the Internet.

19. The system of claim 1, wherein:
the interchangeable EEPROM comprises a first EEPROM configured for a transmit mode and a second EEPROM configured for a receive mode and the EEPROM configured for the receive mode includes an output section configured for operation as a server; and
the CODEC comprises a bit rate of at least 510 Kbits/sec, a sampling rate of at least 48 KHz, and latency not to exceed 22.5 msec for a frame size of 20 msec.

* * * * *